March 18, 1941.                C. W. DIEHL                2,235,399
                        LIGHTNING STROKE GENERATOR
                          Filed Dec. 13, 1939
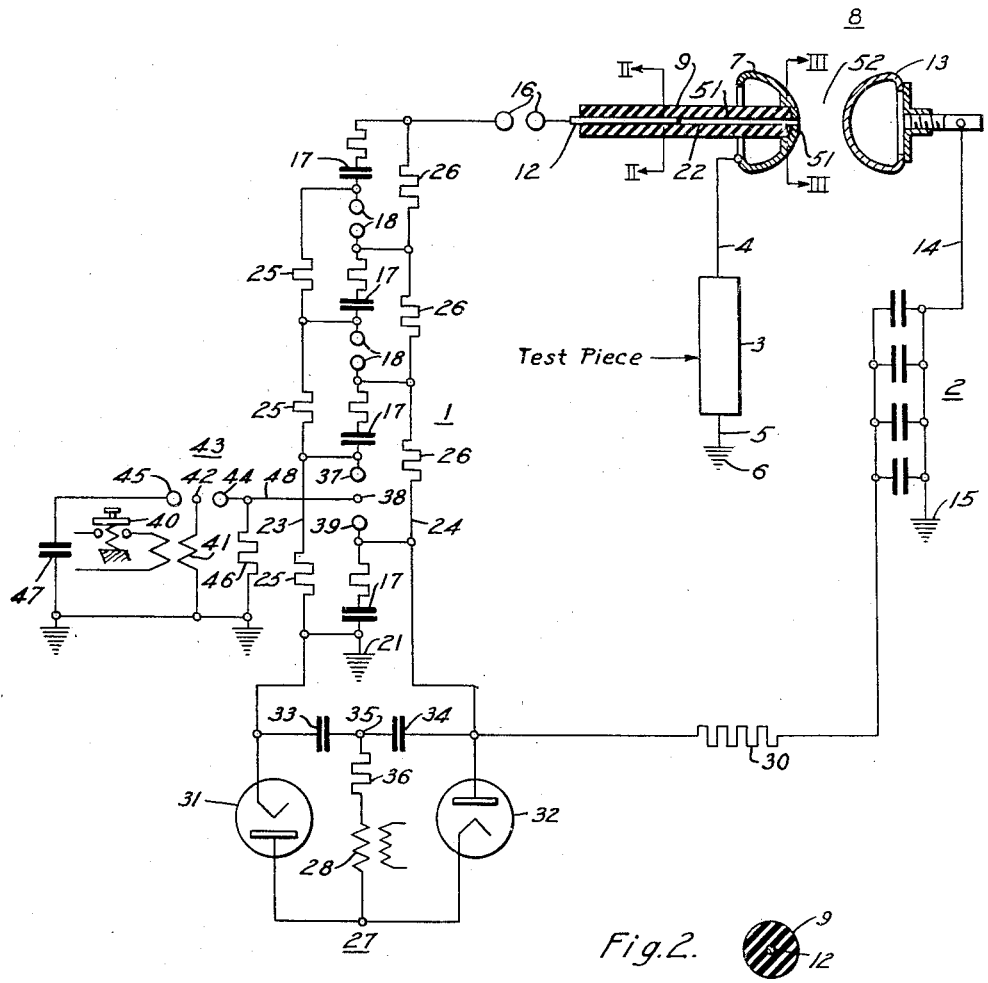
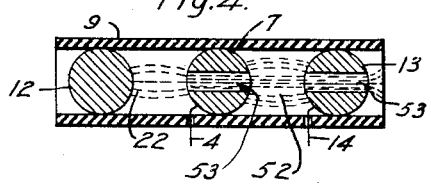
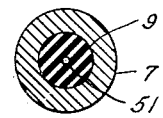
WITNESSES:                                            INVENTOR
N. F. Susser                                        Carl W. Diehl.
                                                    BY Franklin E. Hardy
                                                         ATTORNEY Patented Mar. 18, 1941

2,235,399

UNITED STATES PATENT OFFICE 2,235,399

LIGHTNING STROKE GENERATOR

Carl W. Diehl, Sharon, Pa., assignor to Westinghouse Electric & Manufacturing Company, East Pittsburgh, Pa., a corporation of Pennsylvania Application December 13, 1939, Serial No. 308,991

5 Claims. (Cl. 171—97)

This invention relates to lightning stroke generators in which are combined a lightning stroke voltage generating apparatus and a lightning stroke current generating apparatus, and is particularly directed to controlling the discharge of the several lightning stroke generators or impulse generators to discharge substantially simultaneously.

In Patent No. 2,032,904, issued March 3, 1936 to P. L. Bellaschi for Lightning stroke generator and assigned to the same assignee as this application, a lightning stroke generator is disclosed and claimed that is capable of effecting a high voltage impulse discharge and a high current impulse discharge substantially simultaneously. In that patent the discharge of the high voltage impulse generator to apply a voltage surge to the test piece effects the discharge of the lightning stroke current impulse generator across the terminals of the test piece through an impedance device. In one form of the apparatus shown in the patent, the impedance device is a coil permanently connected between the lightning stroke current generator at the test piece and in another form of the apparatus it is a fusible link enclosed in an insulating housing which, after one or a few microseconds, fuses itself into a low resistance arc, so that the discharge of current from the lightning stroke current generator follows immediately after the initiation of the discharge of the high voltage impulse generator.

The above referred to impedance device is necessary to prevent the voltage generator from discharging altogether through the low impedance circuit of the current generator. Its permanent presence in the circuit in accordance with the first described form of apparatus limits to some extent the effectiveness of the discharge from the current generator. The use of the fusible link to offer a high resistance to the flow of current from the voltage generator through the current generator overcomes this defect in that the link is converted into a low resistance arc in one or a few microseconds after the initiation of the discharge of the voltage generator, thus reducing the impedance in the discharge circuit from the current generator. This latter form of impedance device, however, has the limitation that where the lightning stroke generator is being repeatedly used for testing a large number of devices, it is necessary to renew the fusible link upon each use of the apparatus.

It is an object of my invention to provide a lightning stroke generator employing both a voltage generating apparatus and current generating apparatus in which means are provided for synchronizing the discharge of the voltage generator and current generator without the limitations pointed out above with respect to existing apparatus.

Other objects and advantages of the invention will be apparent from the following description of one embodiment thereof, reference being had to the accompanying drawing, in which:

Figure 1 is a diagrammatic view of apparatus and circuits organized in accordance with the invention, Fig. 2 is a section taken on line II—II of Fig. 1, Fig. 3 is a sectional view taken on line III—III of Fig. 1, and Fig. 4 is a sectional view of a modified arrangement of the synchronizing gaps.

Referring to Figure 1 of the drawing, a lightning stroke voltage generator or voltage impulse generator 1 is illustrated and a lightning stroke current generator or current impulse generator 2 is illustrated for substantially simultaneously applying a high voltage surge and a high current surge to a test piece shown at 3 and having terminal connections 4 and 5, the connection 5 being grounded at 6 and the connection 4 being conductively connected to one electrode 7 of a synchronizing gap device 8. The device 8 includes a tube of insulating material 9 and three electrodes 12, 7 and 13 arranged to form two air gaps 22 and 52. The electrode 13 is connected by conductor 14 to one terminal of the current impulse generator 2, the opposite terminal of which is grounded at 15. The electrode 12 is connected to one of the spaced spheres 16 forming a gap device between the synchronizing device 8 and the high voltage impulse generator 1.

The high voltage impulse generator 1 may consist of a plurality of capacitors 17 connected to discharge in series through a plurality of sphere gaps 18 establishing a high voltage between ground at 21 and the gap between spheres 16 which voltage is applied across the test piece 3 to ground at 6 upon the breakdown of the gap 22 between spheres 12 and 7. The condensers 17 are connected to be charged in parallel from conductors 23 and 24 through individually associated resistors 25 and 26 from a source of energy represented generally at 27 and including an alternating current transformer 28 having a high voltage winding supplying two rectifiers 31 and 32 connected in circuit with electrical storage devices such as capacitors 33 and 34. The high voltage transformer winding 28 is connected to a point 35 between the capacitors 33 and 34 through a resistor 36, and to the outside terminals of the rectifiers 31 and 32. The current impulse generator 2 is charged in parallel and simultaneously with condenser 17 through a circuit including the charging resistor 30.

A gap device is provided for intiating the discharge of the voltage impulse generator 1 including spheres 37, 38 and 39, the two spheres 37 and 39 being connected, respectively, to adjacent capacitors 17. The intermediate sphere 38 is connected to a tripping and synchronizing circuit. A simplified circuit for this purpose is illustrated as comprising a pushbutton switch 40 for closing a circuit to energize a step-up transformer 41, one output terminal of which is connected to the middle electrode 42 of a double gap device 43, the two outer terminals 44 and 45 of which are connected to the other output terminal of the step-up transformer through a resistor 46 and a capacitor 47, respectively, so that the double gap device 43 breaks down at or near the crest of the voltage wave of the transformer 41. The terminal electrode 44 is connected by conductor 48 to the intermediate sphere 38 of the main double gap device including the three electrodes 37, 38 and 39. This connection is such that the intermediate electrode 38 is given a potential which is opposite to the potential of the ungrounded electrode 39 of the main gap device so that the gap between the spheres 38 and 39 first breaks down, after which the full voltage of the lower condenser 17 is applied to the gap between the spheres 38 and 37 causing it to break down. The flow of current through the gap device, including spheres 37, 38 and 39, so modifies the potentials across the succeeding gaps 18 of the impulse generator as to cause the entire series of gaps to break down and apply the entire series voltage of the several capacitors 17 to the gap 16 which, in turn, breaks down and in turn causes the gap 22 between electrodes 12 and 7 to break down applying the high voltage impulse to the test piece 3.

It will be noted by reference to Fig. 3 that an opening 51 is provided through the central portion of electrode 7 permitting the flow of ionized gases therethrough. Upon the breakdown of the gap between electrodes 12 and 7 ionized gas forms a conducting path across the gap 22 between the electrodes 12 and 7, and, guided by the opening 51 in the electrode 7, continues past the electrode 7 into contact with the electrode 13, forming a conducting path 52 through which impulse current flows from the generator 2 to the test piece 3. It will be noted that the spacing of the electrodes 7 and 13 prevents the discharge of the voltage generator 1 through the current generator 2 upon the initial breakdown between the electrodes 12 and 7. The characteristics and quantity of ionized gas evolved upon the discharge between electrodes 12 and 7 is governed by the nature of the material used for the electrodes and for the enclosing tube 9. The time lag between the two surges from the voltage generator and from the current generator, respectively, is governed by the quantity of gas and size of the opening tube 9 or in the size of the discharge opening 51. The tube 9, if desired, may extend to enclose or support all three of the electrodes 12, 7 and 13. In this case the electrode 13 may be provided with an opening similar to 51 to vent the gas.

Such an arrangement is shown in Fig. 4, in which the three electrodes 12, 7 and 13 are shown as spheres within the tube 9, the spheres 7 and 13 having openings 53 therethrough aligned with the axis of the gas discharge path across the gaps 22 and 52.

It will be apparent to those skilled in the art that modifications of the apparatus and circuits illustrated may be made within the spirit of my invention, and I do not wish to be limited otherwise than by the scope of the appended claims.

I claim as my invention:

1. A combined lightning-stroke current and voltage generator including a plurality of capacitors connected to discharge in series, an impulse current generator comprising a plurality of capacitors connected to discharge in parallel, terminal connections for a test piece, means for controlling the connection of said terminal connections to said impulse voltage generator and to said impulse current generator including three electrodes spaced to form two air gaps, means for connecting one of said electrodes to one of said terminal connections, means for connecting another of said electrodes to said impulse voltage generator, means for connecting the other of said electrodes to the impulse current generator, and means for establishing a current conducting arc between the second named of the three electrodes and each of the other two electrodes substantially simultaneously.

2. A combined lightning-stroke current and voltage generator including a plurality of capacitors connected to discharge in series, an impulse current generator comprising a plurality of capacitors connected to discharge in parallel, terminal connections for a test piece, means for controlling the connection of said terminal connections to said impulse voltage generator and to said impulse current generator including three electrodes spaced to form two air gaps, one of said gaps being included in the connection to the impulse voltage generator and the other of said gaps being included in the connection to the impulse current generator, and means for effecting the discharge of the ionized gases from the first above named gap into the space constituting the second named gap.

3. A combined lightning-stroke current and voltage generator including a plurality of capacitors connected to discharge in series, an impulse current generator comprising a plurality of capacitors connected to discharge in parallel, terminal connections for a test piece, means including a pair of synchronizing gaps for connecting said terminal connections to said impulse voltage generator and to said impulse current generator, respectively, comprising three alined electrodes, the middle one of said electrodes having an opening therethrough in line between the two outer electrodes for directing a stream of ionized gas across said two gaps upon a discharge across one of said gaps.

4. A combined lighting-stroke current and voltage generator including a plurality of capacitors connected to discharge in series, an impulse current generator comprising a plurality of capacitors connected to discharge in parallel, terminal connections for a test piece, means for controlling the connection of said terminal connections to said impulse voltage generator and to said impulse current generator including three electrodes spaced to form two air gaps, one of said gaps being included in the connection to the impulse voltage generator and the other in the connection to the impulse current generator, means for effecting the discharge of the ionized gases from the first above named gap into the space constituting the second named gap, and means for directing a stream of ionized gas to connect the three electrodes comprising an opening through one of said electrodes and a tube of insulating material between the electrodes constituting the terminals of the gap included in the connection to the impulse voltage generator.

5. A combined lightning-stroke current and voltage generator including a plurality of capacitors connected to discharge in series, an impulse current generator comprising a plurality of capacitors connected to discharge in parallel, terminal connections for a test piece, means including a pair of synchronizing gaps for connecting said terminal connections to said impulse voltage generator and to said impulse current generator, respectively, comprising three alined electrodes, the middle one of said electrodes having an opening therethrough in line between the two outer electrodes for directing a stream of ionized gas across said two gaps upon a discharge across one of said gaps, and a tube of insulating material between said electrodes for guiding the flow of ionized gas between said two outer electrodes.

CARL W. DIEHL.